UNITED STATES PATENT OFFICE.

RUDOLF LINKMEYER, OF BREMEN, GERMANY.

PROCESS FOR PRODUCING CELLULOSE FORMATIONS.

1,062,106.   Specification of Letters Patent.   Patented May 20, 1913.

No Drawing.   Application filed May 28, 1909.   Serial No. 499,000.

*To all whom it may concern:*

Be it known that I, RUDOLF LINKMEYER, a subject of the German Emperor, and resident of Bremen, Germany, have invented a new and useful Improved Process for Producing Cellulose Formations, of which the following is a specification.

The subject matter of my invention is an improved process for producing formations of cellulose, as for instance, threads, ribbons and the like.

Formations of cellulose from ammoniacal copper oxid solutions cupro-ammonium solutions of cellulose, have hitherto been obtained by precipitating with acids, or in a bath consisting either of caustic alkalis alone, or of chlorids of alkalis mixed with the caustic alkalis.

I have discovered that the chlorids of the magnesium group, such as magnesium chlorid, and, further, the chlorids of the aluminium group, such as aluminium chlorid, can be effectively employed as agents for precipitating the cellulose from the ammoniacal copper oxid solutions.

Artificial threads thus produced show a high degree of elasticity and are perfectly transparent. The formations obtained show immediately after their precipitation a strength of such degree as has not been observed in cases where caustic alkalis had been employed.

It is advantageous to slightly acidulate the bath and to make provision that a slightly acid reaction is maintained by adding small quantities of acid from time to time. Hydrochloric acid has proved very useful for this purpose. It is also advantageous to add to the bath organic substances such as alcohol (monoatomic or polyatomic) and carbohydrates, such as sugar, and others.

*Example.*

An ammoniacal copper oxid solution containing 60 grams of cellulose per liter is used. The precipitating bath consists of a concentrated solution of magnesium chlorid or aluminium chlorid. It may either be used cold or warm. Sufficient hydrochloric acid is added to the bath to produce a slightly acid reaction. Thereafter a small quantity of alcohol is poured into the bath amounting to about one-half per cent. in weight of the entire bath. The desired object is then formed by forcing the solution of cellulose through an opening of suitable shape and bringing the shaped object into contact with the bath as described. The coagulation takes place instantaneously, and it is therefore possible to produce the objects at very great speed.

The cellulose solutions used may also contain other organic substances such as alcohols, carbohydrates, such as gums, etc.

I claim—

1. The process for the production of cellulose formations, which comprises shaping a cupro-ammonium-cellulose solution, and coagulating the shape formed by an acidulated solution containing a chlorid of the magnesium group substantially as described.

2. The process for the production of cellulose formations which comprises shaping a cupro-ammonium cellulose solution and coagulating the shape so formed by an acidulated solution containing a chlorid of the magnesium group and an organic substance.

3. The process for the production of cellulose formations, which comprises shaping a cupro-ammonium cellulose solution and coagulating the shape so formed by a solution containing a chlorid of the magnesium group and an organic substance.

4. The process for the production of cellulose formations, which comprises shaping a cupro-ammonium cellulose solution and coagulating the shape by an acidified solution of magnesium chlorid containing a small quantity of alcohol.

In testimony whereof, I affix my signature in the presence of two witnesses.

RUDOLF LINKMEYER.

Witnesses:
FERDINAND REICH,
PAUL MINCK.